United States Patent
Schwabe

(10) Patent No.: US 6,736,009 B1
(45) Date of Patent: May 18, 2004

(54) MEASUREMENT SYSTEM COMPRISING AN ACCELERATION SENSOR AND A POSITION SENSOR

(75) Inventor: Michael Schwabe, Bad Endorf-Hemhof (DE)

(73) Assignee: Johannes Heidenhain GmbH, Traunreat (DE)

( * ) Notice: Subject to any disclaimer, the term of this patent is extended or adjusted under 35 U.S.C. 154(b) by 0 days.

(21) Appl. No.: 10/089,624
(22) PCT Filed: Aug. 2, 2000
(86) PCT No.: PCT/EP00/07474
§ 371 (c)(1), (2), (4) Date: Jul. 24, 2002
(87) PCT Pub. No.: WO01/23897
PCT Pub. Date: Apr. 5, 2001

(30) Foreign Application Priority Data

Sep. 30, 1999 (DE) .......................... 199 47 277

(51) Int. Cl.⁷ .......................... G01P 15/105; G01P 3/49
(52) U.S. Cl. .................. 73/514.31; 324/164; 73/514.39
(58) Field of Search .................. 73/514.31, 514.26, 73/514.39, 519.01, 520.01; 324/164, 173, 174, 207.22, 207.25, 207.12, 162, 225, 232

(56) References Cited

U.S. PATENT DOCUMENTS

| 4,507,607 A | 3/1985 | Caputo |
| 4,751,459 A | 6/1988 | Stupak, Jr. |
| 4,918,345 A | * 4/1990 | Vaillant de Guelis et al. .......................... 310/90.5 |
| 5,367,257 A | * 11/1994 | Garshelis ................ 324/207.22 |
| 6,462,535 B1 | * 10/2002 | Schwabe ..................... 324/164 |

FOREIGN PATENT DOCUMENTS

| DE | 37 30 841 | 3/1988 |
| EP | 0 661 543 A1 | 7/1995 |
| EP | 0 661 543 B1 | 4/1998 |
| GB | 2 121 968 | 1/1984 |

* cited by examiner

Primary Examiner—Helen Kwok
(74) Attorney, Agent, or Firm—Brinks Hofer Gilson Lione

(57) ABSTRACT

A measurement system for determining acceleration and a position of an object. The measurement system includes a first sensor system for determining an acceleration of an object, the first sensor having a body with an electrically conducting measuring structure, a device for generating a first magnetic field, which acts on the measuring structure and a detector for detecting a second magnetic field or field changes, which are created by eddy currents generated by the measuring structure, the detector generating an output signal. A second sensor system for determining a position of the object, the second sensor system includes a scale graduation that lies opposite the detector and is scanned by the detector in a scanning area in which the measuring structure and the scale graduation are arranged placed on top of each other, or integrated into each other, and wherein the detector generates an acceleration signal and a position signal from a common scanning area. The measuring structure and the scale graduation are formed on a common body.

23 Claims, 3 Drawing Sheets

MEASUREMENT SYSTEM COMPRISING AN ACCELERATION SENSOR AND A POSITION SENSOR

Applicant claims, under 35 U.S.C. §§120 and 365, the benefit of priority of the filing date of Aug. 2, 2000 of a Patent Cooperation Treaty patent application, copy attached, Ser. No. PCT/EP00/07474, filed on the aforementioned date, the entire contents of which are incorporated herein by reference, wherein Patent Cooperation Treaty patent application Ser. No. PCT/EP00/07474 was not published under PCT Article 21(2) in English.

Applicant claims, under 35 U.S.C. §119, the benefit of priority of the filing date of Sep. 30, 1999 of a German patent application, copy attached, Ser. No. 199 47 277.7, filed on the aforementioned date, the entire contents of which are incorporated herein by reference.

BACKGROUND OF THE INVENTION

1. Field of the Invention

The present invention relates to a measurement system.

2. Description of the Related Art

A measurement system is described in EP 0 661 543 B1. It includes an acceleration sensor in the form of a Ferraris sensor, wherein a magnetic flux passes vertically through an electrically conducting disk, constituting the measuring structure. This magnetic flux is generated by a magnet. If the disk is moved with respect to the magnet, eddy currents are created, which in turn generate a magnetic field. The changes in this magnetic field, or flux, are detected by a detector in the form of a coil and are a measure for the acceleration. An optically or inductively scannable scale graduation is fixed on the edge of this disk and is scanned by a scanning head for determining the position of this disk.

SUMMARY AND OBJECTS OF THE INVENTION

It is therefore an object of the present invention to design a measurement system with an acceleration sensor and a position sensor in such a way that as compact a structure as possible is achieved.

This object is attained by a measurement system for determining acceleration and a position of an object. The measurement system includes a first sensor system for determining an acceleration of an object, the first sensor system having a body with an electrically conducting measuring structure, a device for generating a first magnetic field, which acts on the measuring structure and a detector for detecting a second magnetic field or field changes, which are created by eddy currents generated by the measuring structure, the detector generating an output signal. A second sensor system for determining a position of the object, the second sensor system includes a scale graduation that lies opposite the detector and is scanned by the detector in a scanning area in which the measuring structure and the scale graduation are arranged placed on top of each other, or integrated into each other, and wherein the detector generates an acceleration signal and a position signal from a common scanning area. The measuring structure and the scale graduation are formed on a common body.

The measurement system of the present invention has the advantage that the scale graduation required for the position measurement is provided directly on the measuring structure for the acceleration measurement and is therefore arranged in a space-saving manner. The acceleration signal and the position signal are here derived from a common scanning area. It is realized that no scanning areas which are located transversely with respect to the measuring direction are required.

Advantageously the electrical properties of the measuring structure of the acceleration sensor are not affected by the scale graduation. The scale graduation of the acceleration sensor can be realized in a separate layer, or in a layer package, which is connected with the measuring structure of the acceleration sensor in such a way that the measuring structure can expand independently of the layers supporting the scale graduation.

It is alternatively possible to embody the scale graduation in the measuring structure itself, wherein it is then necessary to make provisions, such as signal filtering, signal smoothing, multiplexing, or switching between several detectors, or averaging, in order to keep the acceleration signal as unaffected as possible by the measuring representation.

The present invention will be explained in greater detail in what follows by the drawings. Shown are in:

DESCRIPTION OF THE PREFERRED EMBODIMENT(S) OF THE INVENTION

Figure 1:
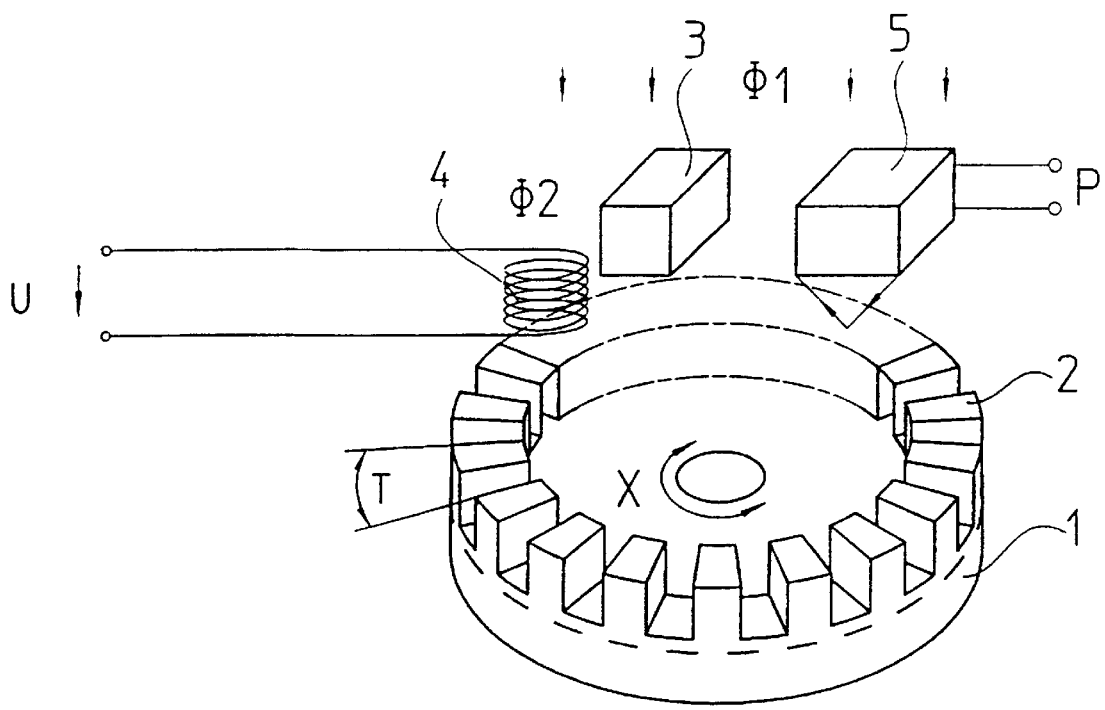
FIG. 1 schematically shows a perspective view of a first exemplary embodiment of a measurement system in accordance with the present invention.

The measurement system in accordance with FIG. 1 includes a disk 1 made of an electrically conducting material, on whose surface a scale graduation in the form of an incremental scale graduation 2, which can be photoelectrically scanned, has been embodied. For this purpose the disk 1 itself can be structured on its surface in that, for example, depressions are partially cut in the circumferential direction (movement direction X), wherein the alternatingly arranged depressions and elevations form a phase grating, known per se.

However, the graduation 2 can also be embodied as a separate layer, or as a layered package, on the disk 2, this embodiment is shown in dashed lines of FIG. 1.

A sensor system for measuring acceleration of disk 1 includes magnet 3, disk 1 and coil 4. In particular, a magnet 3, or a coil for generating a magnetic field $\Phi 1$, which acts on the disk 1 vertically with respect to the movement direction X, is provided for measuring the acceleration of the disk 1 in the movement direction X (rotation). The magnetic field $\Phi 1$ creates eddy currents in the disk 1, which are proportional to the movement speed of the disk 1. These eddy currents create a further magnetic field Φ2, which is detected by a coil 4. The voltage U generated in the coil 4 is proportional to the acceleration of the disk 1. This principle of acceleration measurement is also known as the Ferraris principle.

A sensor system for measuring a position of disk 1 includes disk 1, scanning head 5 and graduation 2. In accordance with the present invention, the position signal P for the position measurement is obtained from the same area of the disk 1 from which the acceleration U is derived. A scanning head 5 is assigned to the graduation 2 for this purpose, which in a known manner contains a light source and a photosensitive cell. The light from the light source is directed onto the graduation 2, is modulated there as a function of the position and is reflected toward the photosensitive cell.

If the graduation 2 is an integral part of the disk 1, or if the graduation 2 has a layer of electrically conductive material, eddy currents are also created in the graduation 2 as a rule. This can affect the acceleration measurement in an undesirable way. To prevent eddy currents in the graduation 2, a value is selected for the graduation period T so that they cannot flow. In the course of this, use is made of the fact that eddy currents have a defined spatial extension, which is not present in a graduation 2 of an appropriately fine graduation period T, in particular less than 0.3 mm. It is possible in this way to effectively prevent eddy currents, which could alter the result of the acceleration measurement, from being induced in the area of the graduation 2, even though it is made of a conductive material.

If the graduation 2 is exclusively of an electrically non-conducting material, the graduation 2 does not affect the acceleration measurement. In this case the graduation 2 can be a known phase grating, made of areas of different refractive indices and/or step heights, which are alternatingly arranged in the measuring direction X.

If the graduation 2 contains electrically conducting material, and if the graduation period is not selected to be so fine that eddy currents cannot be created at all, there is the possibility of selecting the active detection surface of the coil 4 to be sufficiently large, so that the magnetic field Φ2 detected by the magnetic coil 4 is averaged over many graduation periods P. Because of this, only negligible fluctuations in the detected acceleration signal U are caused by the graduation 2. In order to provide integration of as many graduation periods P as possible, the coil 4 can be designed in such a way that the active surface through which the flux Φ2 generated by the eddy current passes describes at least approximately a whole circle of 360. A parallel or series connection of several smaller coils is alternatively also conceivable. In this case it is advantageous to produce the coil, or the coils, by thin film technology. Then the support for the coils can simultaneously be the support for the elements of the scanning head for position measuring.

Alternatively to this there is the option that the position information P is contained in the acceleration signal U, and these high-frequency signal portions are separated from the low-frequency signal portion of the acceleration signal U by a high-pass filter. A counter is then triggered by the output signal of the high-pass filter which counts position changes in multiples of the graduation period T. The position, as well as the acceleration, are determined by evaluating the output signal U of the coil 4.

If the graduation 2 is embodied as a separate layer, or as a layer package, on the disk 1, it is advantageous if the connection of the graduation 2 with the disk 1 permits a temperature-related expansion of the disk 1 in relation to the graduation layer 2 without an impermissible force being exerted on the graduation layer 2, so that no deformation, or even destruction, of the graduation layer because of an expansion of the disk 1 results.

The graduation 2 can also be embodied so it can be scanned capacitively, inductively or magnetically.

Figure 2:
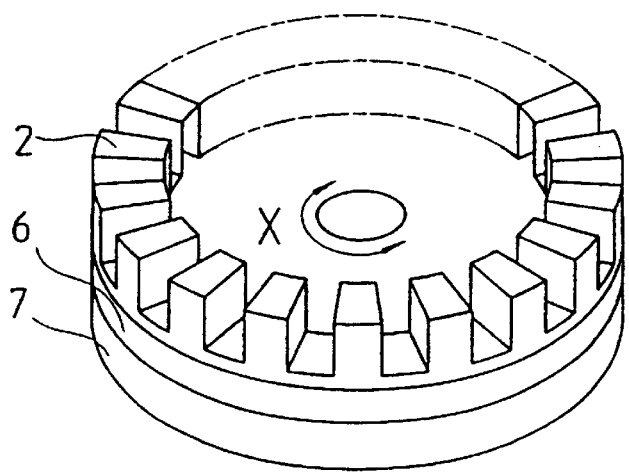
FIG. 2 shows a perspective view of a second exemplary embodiment of a sensor system in accordance with the present invention to be used with the measurement system of FIG. 1.

The measuring structure for acceleration measurement need not be embodied as a disk 1, it can also be applied as a layer 6 made of an electrically conducting material on an insulating support 7, for example made of glass, plastic or printed circuit board material. The graduation 2 can be embodied on this support 7 on the layer 6 in the form of a stepped reflecting phase graduation, or in the form of an amplitude grating produced in accordance with known lithographic methods. This embodiment is schematically represented in FIG. 2.

Figure 3:
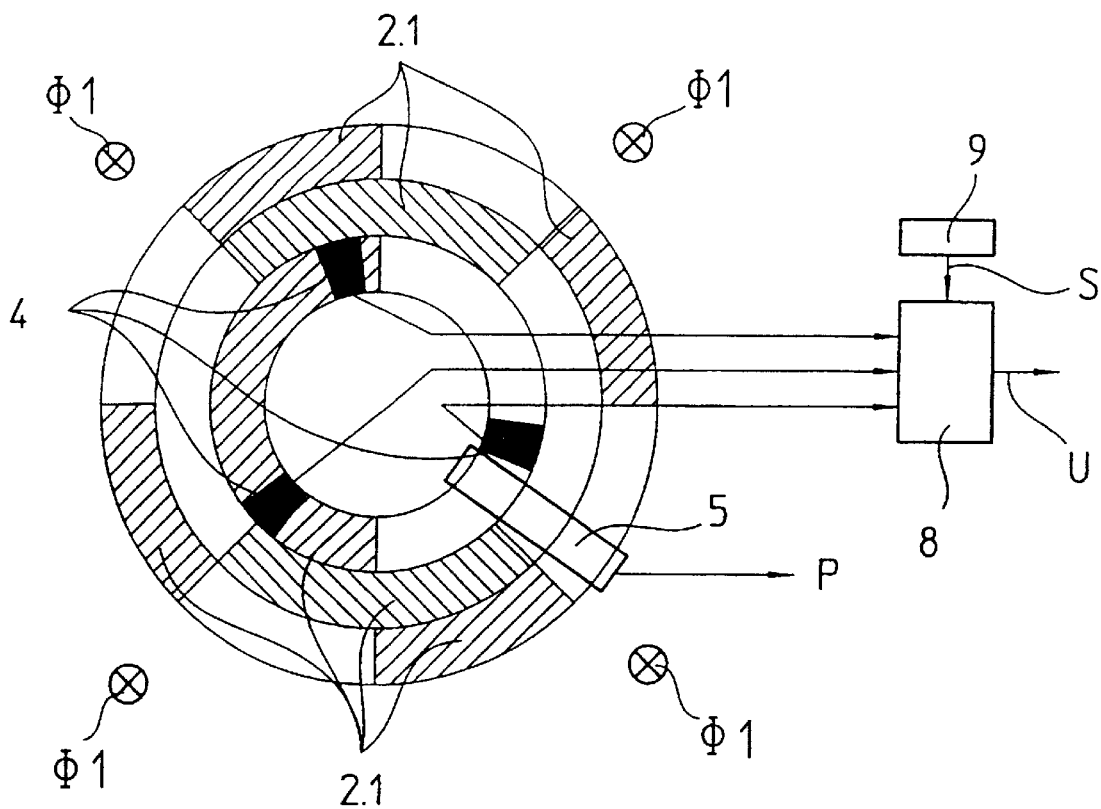
FIG. 3 schematically shows a top view of a second exemplary embodiment of a measurement system in accordance with the present invention.
Figure 4:
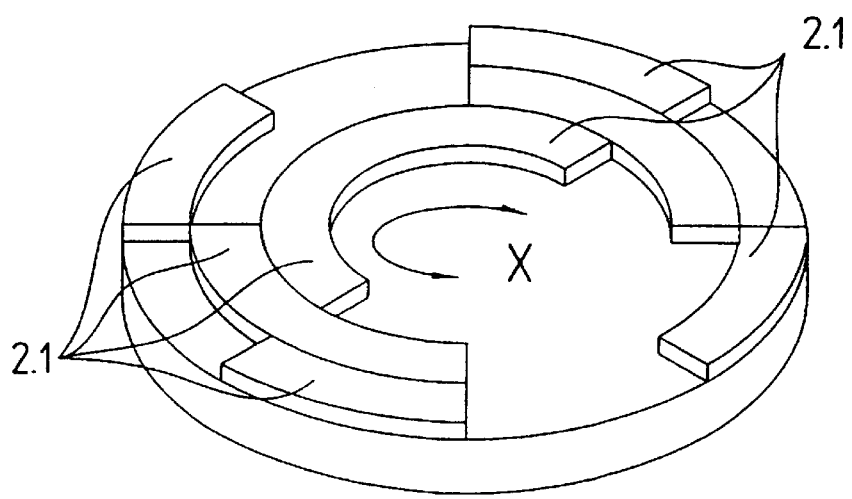
FIG. 4 shows a perspective plan view of a second exemplary embodiment of a measuring structure in accordance with the present invention to be used with the measurement system of FIG. 3.

How conducting areas 2.1 of an absolute graduation can be used as a measuring structure for acceleration measurement at the same time is described in a further exemplary embodiment in accordance with FIGS. 3 and 4. FIG. 3 shows a view from above on a known absolute graduation 2 which, in accordance with the present invention, is scanned for determining a position, as well as by the acceleration sensors 4. FIG. 4 represents a perspective view of the graduation 2 in FIG. 3. Electrically conducting areas 2.1 are distributed on a rotating, non-conducting support 7, so that the conducting areas 2.1 form an absolute coded graduation 2. In accordance with FIG. 3, the acceleration sensors 4 are arranged in such a way that at least one acceleration sensor 4 is always above a conducting area 2.1. Because of a constant magnetic flux Φ1 vertically with respect to the surface of the graduation 2, which is generated by a device not represented here, changing eddy currents are caused in the conducting areas 2.1 in case of an accelerated movement of the graduation 2. In the simplest case the device for generating a constant magnetic flux Φ1 is a permanent magnet. The eddy currents, which change with an accelerated movement, cause a magnetic flux Φ2 themselves, which is detected by the acceleration sensors in the form of several coils 4.

In this case the acceleration sensors 4 must be arranged, or it is necessary to arrange as many acceleration sensors 4 in such a way that during the rotation at least one acceleration sensor 4 is always over a conducting area 2.1. Moreover, eddy currents at the edge of the conducting area 2.1 should not be detected, because there the eddy currents are affected by the border of the conducting area 2.1, so that it is advantageous to arrange at least three acceleration sensors. By this it is possible to assure that a change of the eddy current field because of an acceleration can always be detected by at least one of the acceleration sensors 4.

In accordance with the shape of the conducting areas 2.1 above which the acceleration sensors 4 are arranged, the arrangement of the acceleration sensors 4, the detected position and direction of rotation, the output signal of the respective acceleration sensor 4 which at that time is located over a conducting area 2.1 is passed on for evaluation by a switching device 8. It is possible here to implement the switching device 8 as a multiplexer known from the prior art, for which the control signals S for switching are detected in a control unit 9 from the shape of the conducting areas 2.1 above which the acceleration sensors 4 are arranged, the arrangement of the acceleration sensors 4, the detected position and direction of rotation. Switching of the configuration includes acceleration sensors 4 and conducting areas 2.1 of an absolute graduation 2 represented in FIG. 3 from one acceleration sensor 4 to the next takes place in the order of their arrangement in a clockwise or counterclockwise direction after a rotation of the graduation 2 over 120.

In a further embodiment, the conducting areas 2.1 of the absolute graduation 2 can be provided on both sides of the graduation support 7. In that case the top and underside are scanned by acceleration sensors 4. This has the advantage that it is possible by an appropriate switching of the output signals from the acceleration sensors 4 to compensate fluctuating distances between the acceleration sensors 4 and the conducting areas 2.1. When the distance between the acceleration sensors 4 and the conducting areas 2.1 on the top increases, this distance decreases on the underside, and vice versa. This is used for compensating the amplitude fluctuations of the output signals of the acceleration sensors 4.

The exemplary embodiments so far are related to rotary measurement systems. The teaching regarding technical processes recited in these exemplary embodiments can also be identically employed with linear measuring systems, the same as the teaching regarding technical processes in the following exemplary embodiment of a linear measurement system can be employed in a manner identical to that of a rotary measurement system.

Figure 5:
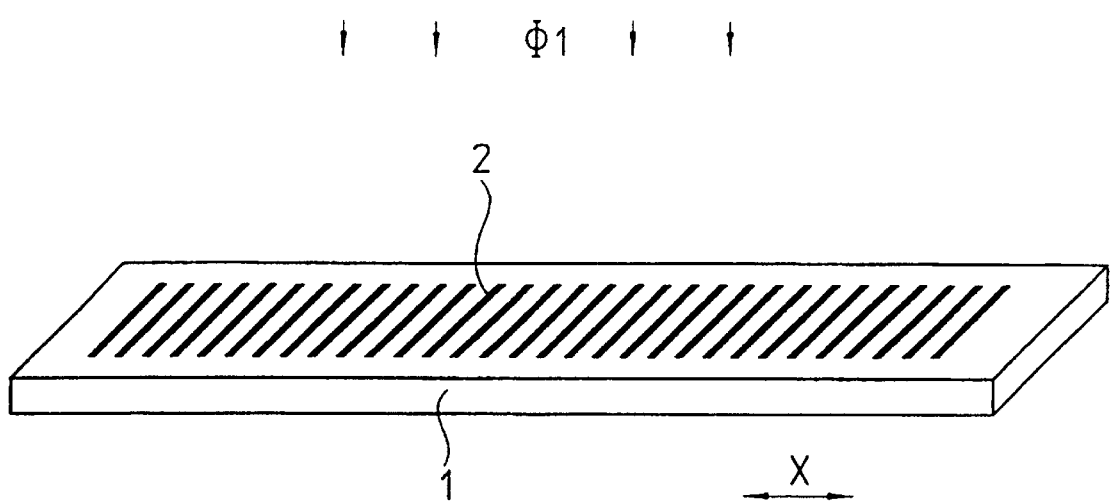
FIG. 5 shows a perspective view of a third exemplary embodiment of a sensor system in accordance with the present invention to be used with the measurement systems of FIGS. 1 and 3.

In the exemplary embodiment of FIG. 5, a graduation structure 2 of a linear measurement system is directly integrated in a measuring structure 1 for the acceleration sensor. This takes place in that the measuring structure is designed to be electrically homogeneous and optically inhomogeneous.

For this purpose, a ribbon-shaped electrical conductor 1 is provided as the measuring structure 1 for the acceleration sensor, whose surface facing the scanning head 5 only slightly reflects light. Subsequently the surface of the ribbon-shaped conductor 1 is processed in such a way that, corresponding to the desired graduation period of the position sensor, light is well reflected in the processed areas. The reverse case is of course also possible, that light is well reflected by the ribbon-shaped electrical conductor 1 and, following processing, is only badly reflected in the processed areas.

Because processed and non-processed areas of the graduation period T alternate, it is possible to implement an incremental or absolute graduation 2, which can be used for a position measurement based on the optical scanning principle. Since only the optical properties of the ribbon-shaped conductor 1 are changed, its electrical conductivity is not change by the graduation 2, and therefore eddy currents for acceleration measurement are not affected by the graduation 2 for position measurement.

Processing of areas for making them more or less reflective can be performed in several different ways. For example, a thin non-conducting marking can be applied, or an already provided thin non-conducting marking can be removed. Here, the thin, non-conducting marking and the electrical conductor 1 should have different optical properties, by which a graduation 2 for optical scanning is provided.

Further possibilities for providing the electrical conductor 1 with an optical, inductive, magnetic or capacitive graduation 2 without changing the electrical resistance include changing the structure of the material to correspond to the graduation period T. Furthermore, the structure of the electrical conductor 1 can be partially changed by conversion or doping in order to obtain a graduation 2 without changing the electrical properties.

Alternatively to that there is also the possibility of removing material from the measuring structure 1 at places at which markings for a position measurement are intended. This can take place by an etching process, for example. By this the conductivity is reduced at these locations, which can be undesirable. To compensate for this, material with optical properties which are different in comparison with the material of the measuring structure 1 is deposited at these locations. Here, the amount of the deposited material is selected as a function of the conductivity of this material, so that the measuring structure 1 for the acceleration measurement again has the same electrical conductivity at each location.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. A measurement system for determining acceleration and a position of an object, comprising:
    a first sensor system for determining an acceleration of an object, said first sensor system comprising:
        a body with an electrically conducting measuring structure;
        a device for generating a first magnetic field, which acts on said measuring structure; and
        a detector for detecting a second magnetic field or field changes, which are created by eddy currents generated by said measuring structure, said detector generating an output signal;
    a second sensor system for determining a position of said object, said second sensor system comprises a scale graduation that lies opposite said detector and is scanned by said detector in a scanning area in which said measuring structure and said scale graduation are arranged placed on top of each other, or integrated into each other, and wherein said detector generates an acceleration signal and a position signal from a common scanning area; and
    said measuring structure and said scale graduation are formed on a common body.

2. The measurement system in accordance with claim 1, wherein said scale graduation comprises electrically conducting areas.

3. The measurement system in accordance with claim 1, wherein said measuring structure is structured in such a way that said second magnetic field varies as a function of a position in a movement direction of said body.

4. The measurement system in accordance with claim 2, wherein said measuring structure is structured in such a way that said second magnetic field varies as a function of a position in a movement direction of said body.

5. The measurement system in accordance with claim 1, wherein said acceleration signal is superimposed on said position signal.

6. The measurement system in accordance with claim 4, wherein said acceleration signal is superimposed on said position signal.

7. The measurement system in accordance with claim 1, further comprising:
    a filter that receives said acceleration signal and selects high-frequency signals; and
    high-frequency components that generate said position signal.

8. The measurement system in accordance with claim 1, further comprising:
- a second detector that generates a second output signal;
- a switching device that selects either said output signal or said second output signal as said acceleration signal.

9. The measurement system in accordance with claim 8, where said scale graduation comprises a partially electrically conducting area.

10. The measurement system in accordance with claim 2, wherein said scale graduation comprises a layer or a layer package which is applied on said electrically conducting areas.

11. The measurement system in accordance with claim 10, wherein said measuring structure comprises a layer or a layer package of electrically conducting material on an electrically non-conducting support.

12. A measurement system for determining acceleration and a position of an object, comprising:
- a first sensor system for determining an acceleration of an object, said first sensor system comprising:
  - a body with an electrically conducting measuring structure;
  - a device for generating a first magnetic field, which acts on said measuring structure; and
  - a first detector for detecting a second magnetic field or field changes, which are created by eddy currents generated by said measuring structure, said first detector generating an output signal;
- a second sensor system for determining a position of said object, said second sensor system comprises a scale graduation that lies opposite said first detector and is scanned by a position detector in a scanning area in which said measuring structure and said scale graduation are arranged placed on top of each other, or integrated into each other, and wherein said first detector generates an acceleration signal and said position detector generates a position signal from a common scanning area; and
- said measuring structure and said scale graduation are formed on a common body.

13. The measurement system in accordance with claim 12, wherein said scale graduation comprises electrically conducting areas.

14. The measurement system in accordance with claim 12, wherein said measuring structure is structured in such a way that said second magnetic field varies as a function of a position in a movement direction of said body.

15. The measurement system in accordance with claim 13, wherein said measuring structure is structured in such a way that said second magnetic field varies as a function of a position in a movement direction of said body.

16. The measurement system in accordance with claim 12, further comprising:
- a second detector that generates a second output signal;
- a switching device that selects either said output signal or said second output signal as said acceleration signal.

17. The measurement system in accordance with claim 16, where said scale graduation comprises a partially electrically conducting area.

18. The measurement system in accordance with claim 17, wherein said scale graduation comprises a layer or a layer package which is applied on said partially electrically conducting area.

19. The measurement system in accordance with claim 12, wherein said scale graduation is embodied to reflect light and comprises elevations and depressions which are alternatingly arranged in a movement direction of said body.

20. The measurement system in accordance with claim 19, wherein said elevations comprise electrically conducting areas, whose dimensions are selected to be so small that no eddy currents are created.

21. The measurement system in accordance with claim 12, wherein said scale graduation is structured to be photoelectrically scannable and wherein said detector comprises an optical scanning head for scanning said scale graduation.

22. The measurement system in accordance with claim 13, wherein said scale graduation comprises a layer or a layer package which is applied on said electrically conducting areas.

23. The measurement system in accordance with claim 22, wherein said measuring structure comprises a layer or a layer package of electrically conducting material on an electrically non-conducting support.

\* \* \* \* \*

UNITED STATES PATENT AND TRADEMARK OFFICE
CERTIFICATE OF CORRECTION

PATENT NO. : 6,736,009 B1
DATED : May 18, 2004
INVENTOR(S) : Michael Schwabe

It is certified that error appears in the above-identified patent and that said Letters Patent is hereby corrected as shown below:

Column 8,
Line 32, before "detector" insert -- position --.

Signed and Sealed this

Sixth Day of September, 2005

JON W. DUDAS
*Director of the United States Patent and Trademark Office*